(12) United States Patent
Hewitt et al.

(10) Patent No.: US 11,038,918 B1
(45) Date of Patent: *Jun. 15, 2021

(54) MANAGING UNPATCHED USER DEVICES (71) Applicant: Wells Fargo Bank, N.A., San Francisco, CA (US)

(72) Inventors: Aimee J. Hewitt, Salisbury, NC (US); Joseph R. Kaluzny, Harrisburg, NC (US); Douglas C. Rambo, Davidson, NC (US); Steven M. Trudeau, Advance, NC (US); Bryan Hall, Charlotte, NC (US); Andrew J. Garner, IV, State Road, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,930

(22) Filed: Jun. 24, 2019

Related U.S. Application Data (63) Continuation of application No. 15/164,236, filed on May 25, 2016, now Pat. No. 10,333,973.

(51) Int. Cl.
*H04L 29/06* (2006.01)
*G06F 21/12* (2013.01)
(Continued)

(52) U.S. Cl.
CPC ........ *H04L 63/1475* (2013.01); *G06F 21/121* (2013.01); *G06F 21/128* (2013.01); *G06Q 40/02* (2013.01); *H04L 63/08* (2013.01); *H04L 63/101* (2013.01); *G06F 21/10* (2013.01); *G06F 21/12* (2013.01); *G06F 21/57* (2013.01); *G06F 21/577* (2013.01); *H04L 63/1433* (2013.01); *H04L 63/1483* (2013.01); *H04L 63/20* (2013.01); *H04L 63/30* (2013.01); *H04L 63/306* (2013.01)

(58) Field of Classification Search
CPC . H04L 29/06; H04L 63/1433; H04L 63/1475; H04L 63/1483; H04L 63/20; H04L 63/30; H04L 63/306; G06F 21/00; G06F 21/10; G06F 21/12; G06F 21/121; G06F 21/128; G06F 21/57; G06F 21/577
See application file for complete search history.

(56) References Cited

U.S. PATENT DOCUMENTS

| 6,766,458 | B1 * | 7/2004 | Harris | G06F 21/577 709/206 |
| 8,332,943 | B2 * | 12/2012 | Sauve | H04L 63/1433 726/23 |

(Continued)

*Primary Examiner* — Jayesh M Jhaveri
(74) *Attorney, Agent, or Firm* — Walter Haverfield LLP; James J. Pingor (57) ABSTRACT

The innovation disclosed and claimed herein, in one aspect thereof, comprises a management system and method of handling unpatched users. When a user requests to access their user account or a network, the user is checked for type of browser the user is being used and which version of the browser is being used. If the user is using an unsecured or unpatched browser, the system offers to update the browser software or provide a virtual machine through the browser so that malware cannot transfer from the user computer to the network. The virtual machine can provide a virtual keyboard to protect the user's login credentials from a key logger. The user logs into the user account within the virtual machine.

20 Claims, 6 Drawing Sheets

(51) Int. Cl.
*G06F 21/57* (2013.01)
*G06F 21/10* (2013.01)
*G06Q 40/02* (2012.01)

(56) References Cited

U.S. PATENT DOCUMENTS

| | | | |
|---|---|---|---|
| 10,536,556 B2* | 1/2020 | Karalis | H04L 63/1433 |
| 2004/0006709 A1* | 1/2004 | Chen | G06F 21/83 |
| | | | 726/7 |
| 2006/0185018 A1 | 8/2006 | Saretto et al. | |
| 2006/0294587 A1 | 12/2006 | Bowden et al. | |
| 2007/0199044 A1* | 8/2007 | Hughes | H04L 63/20 |
| | | | 726/1 |
| 2008/0177994 A1 | 7/2008 | Mayer | |
| 2014/0344904 A1 | 11/2014 | Venkataramani et al. | |
| 2015/0058923 A1* | 2/2015 | Rajagopal | G06F 21/53 |
| | | | 726/1 |
| 2016/0099972 A1* | 4/2016 | Qureshi | H04L 63/20 |
| | | | 726/1 |
| 2016/0154539 A1* | 6/2016 | Buddhiraja | H04L 63/10 |
| | | | 715/738 |
| 2016/0350539 A1* | 12/2016 | Oberheide | H04L 63/20 |
| 2017/0237775 A1 | 8/2017 | Lu et al. | |

* cited by examiner

MANAGING UNPATCHED USER DEVICES

CROSS-REFERENCE TO RELATED APPLICATIONS

This application is a continuation of U.S. patent application Ser. No. 15/164,236, entitled "MANAGING UNPATCHED USERS," and filed May 25, 2016, the entirety of which is incorporated herein by reference.

BACKGROUND

Providing customers access to networks is becoming increasingly more common. Customers demand access to networks to be available at any time, in particular financial institutions that provide network access to user accounts. However, such access can be dangerous for the network providers as well as dangerous for less technologically advanced users. A user operating an outdated browser, computer, or has not updated for crucial security patches are susceptible to malware that can steal their online logins and access to their financial accounts.

BRIEF DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of managing unpatched users. A customer, e.g. a general banking customer or home user requesting access to a network, may be checked for up to date software before being allowed access to the network.

In aspects of the innovation, a management system and method is contemplated for handling unpatched user devices. When a user device requests to access their user account or a network, the user device is checked for type of browser the user is being used and which version of the browser is being used. If the user is using an unsecured or unpatched browser, the system offers to update the browser software, redirect to the browser vendor to update, or provide a virtual machine through the browser so that the user's information is protected from malware residing on the user computer. The virtual machine can provide a virtual keyboard to protect the user's login credentials from a key logger. The user logs into the user account within the virtual machine.

In aspects, the subject innovation provides substantial benefits in terms of network security and protecting user accounts. One advantage resides in ensuring user devices are up to date before allowing access to the network or user account. Another advantage is protected user's information from malware residing on the user's computer and/or devices. Yet another advantage resides in protecting malware from transferring from an unsecured user device to a financial institution network.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 1:
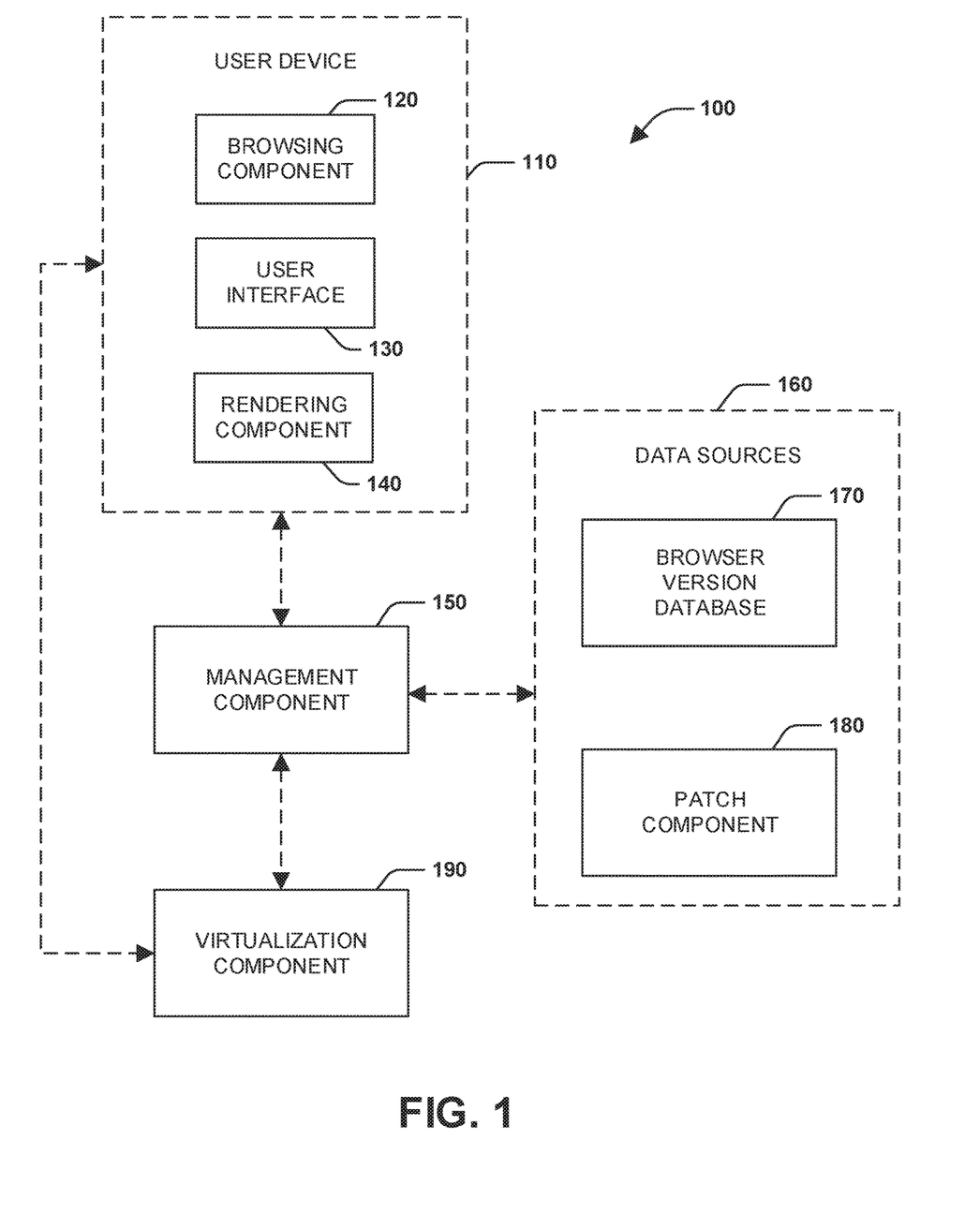
FIG. 1 illustrates a system for managing unpatched user devices.

With reference to FIG. 1, a system 100 for managing unpatched user devices is depicted. The system 100 includes a user device 110 of a user. Typically the user is a customer of a financial institution or other business that provides a user account that a user can access from the user device 110. The user device 110 can be a computer, laptop, mobile device, and/or the like. The user device 110 includes a browsing component 120. The browsing component 120 can be a browser software application capable to access internet web sites or applications and/or the like. For example, the browsing component 120 can utilize a memory and a processor to run a browser used by a user. The user manipulates the user device 110 and the browsing component 120 via a user interface 130. The user interface 130 can be an operating system, a keyboard, a mouse, a touchscreen, and/or the like. The user interface 130 can accept user inputs to manipulate the user device 110 and/or the browsing component 120. The user device 110 incudes a rendering component 140. The rendering component 140 can be a display to graphically present images to the user and facilitate the user operation of the user device 110. The rendering component 140 can be a liquid crystal display, plasma, light emitting diode display, or the like.

The user device 110 can be used to access a user account. When the user attempts to access the user account, the user device 110 and/or the browsing component 120 generates an access request. The access request can include user input authentication credentials, browser information, and/or other user or user device information. The user device 110 sends the access request to a management component 150. The management component 150 can resides remotely from the user device. In one embodiment, the management component 150 resides at a financial institution system providing access to the user account. The user device 110 can access the management component 150 over the internet or network.

The management component 150 determines a security status of the user device 110, e.g. whether the user device 110 and/or the browsing component 120 are up to date or are unsecured. The management component 150 can receive and/or obtain information regarding the user device 110 and/or browsing component 120.

Figure 2:
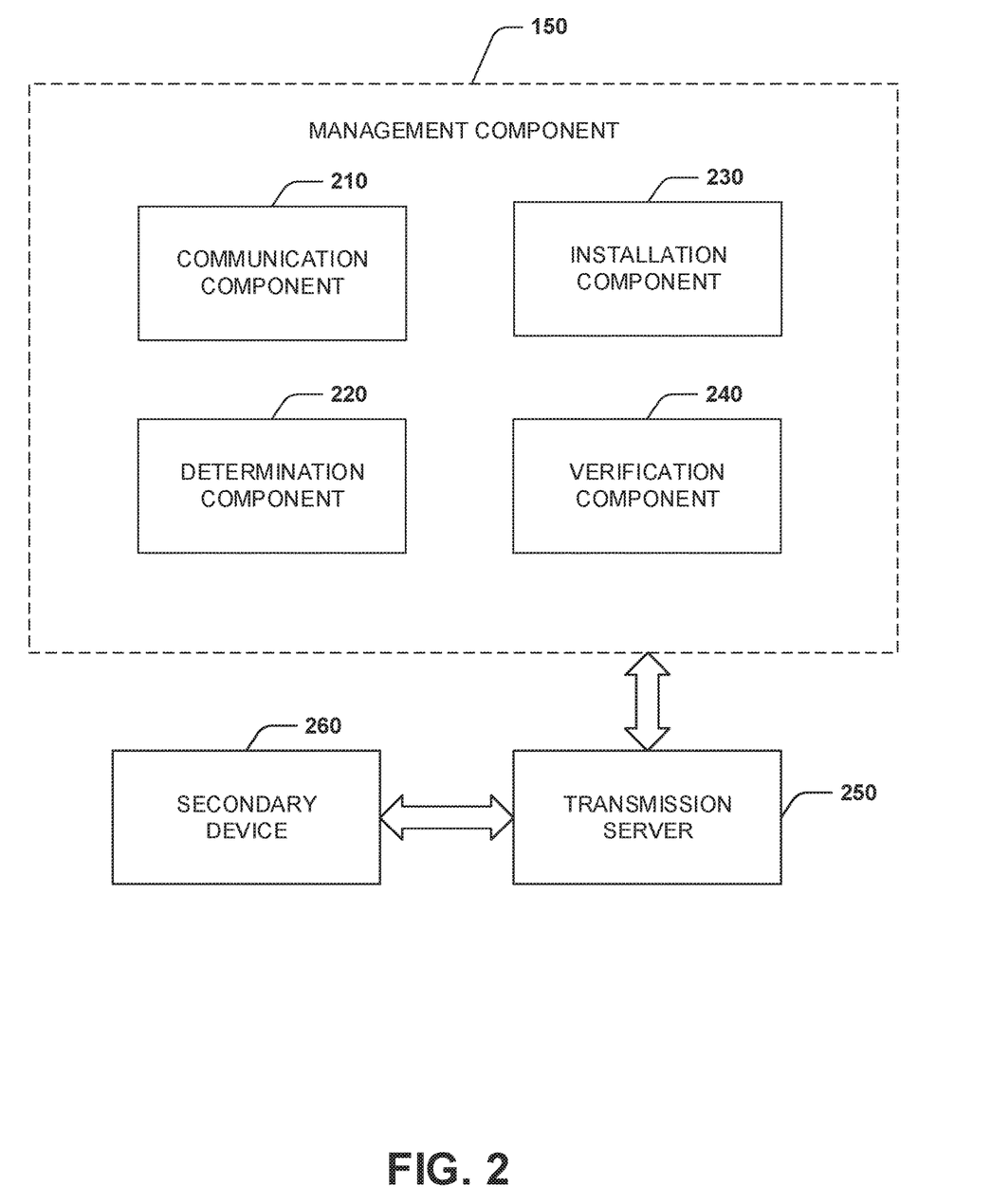
FIG. 2 illustrates an example component diagram of a management component.

With reference to FIG. 2, and continuing reference to FIG. 1, the management component 150 includes a communication component 210. The communication component 210 establishes a data connection between the user device 110 and the management component 150. The management component 150 receives the access request from the user device 110 at the communication component 210. The communication component 210 can send and receive data via a wireless local area network (LAN), wired LAN, TCP/IP protocol, application programming interface (API) call and response, and/or the like.

The management component 150 via the communication component 210 can query data sources 160. The data sources 160 can include a browser version database 170. The browser version database 170 can include a whitelist of acceptable browsers and their versions that are allowed to be used by the user device to obtain access to the user account. In another embodiment, the browser version database 170 can include a browser blacklist of browsers and their versions to be denied access. The browser version database 170 can be on a granular level by including specific browser versions or updates of a specific browser. For example, Generic Browser version 1.1 may be denied as unsecured while Generic Browser version 2.2 may be allowed. In one embodiment, the whitelist or blacklist can list user device operating system versions.

The management component 150 includes a determination component 220 that determines the security status of the user device 110 and/or browsing component 120. The determination component 220 determines the browser version of the browsing component 120. In one embodiment, the determination component 220 can receive the browser version from the access request via metadata in the access request. In another embodiment, the determination component 220 can query the user device 110 for the browser version via an API call and response. The determination component 220 accesses the data sources 160 as described above to compare with the browser version.

The determination component 220 determines the browser generating the access request is outdated. The determination component 220 compares the browser information from the browsing component 120 against the browser version database 170. If the browser information is on a whitelist, the management component 150 approves the access request.

If the browser information is not on the whitelist, the management component 150 can offer further options for the user. In one embodiment, the management component 150 can offer a redirect to a browser vendor web site to download and install a security patch that puts the browser into compliance with the whitelist. In another embodiment, the data sources 160 can include a patch component 180. The management component 150 via the communication component 210 can access the patch database 180. The patch component 180 is a repository for updates and/or installation files. In another embodiment, the patch component 180 can be a database that includes URL links to updates and/or installation files located remotely. The management component 150 can generate an alert message to the user to view on the user device 110. The management component 150 can include in the alert message an option to update the browsing component 120 to an allowed version and include a link from the patch database 180.

The management component 150 includes an installation component 230. The installation component 230 can remotely install patches to the browsing component 120 on the user device 110. The installation component 230 can request permission from the user on the user device 110. The installation component 230 can download installation files and/or direct the user to download the installation files to patch the browsing component 120.

The management component 150 can include a link for the user to use a virtual machine. If the user opts to use a virtual machine, a virtualization component 190 generates a virtual machine with which the user can interact and access the user account and/or network. The virtual machine can be operated with the browsing component 120. The virtual machine prevents malware or other harmful security threats residing on the user device 110 from crossing over to the management component 150 or the network. The user interacts/manipulates the virtual machine on their own user device 110 and/or browsing component 120.

Figure 3:
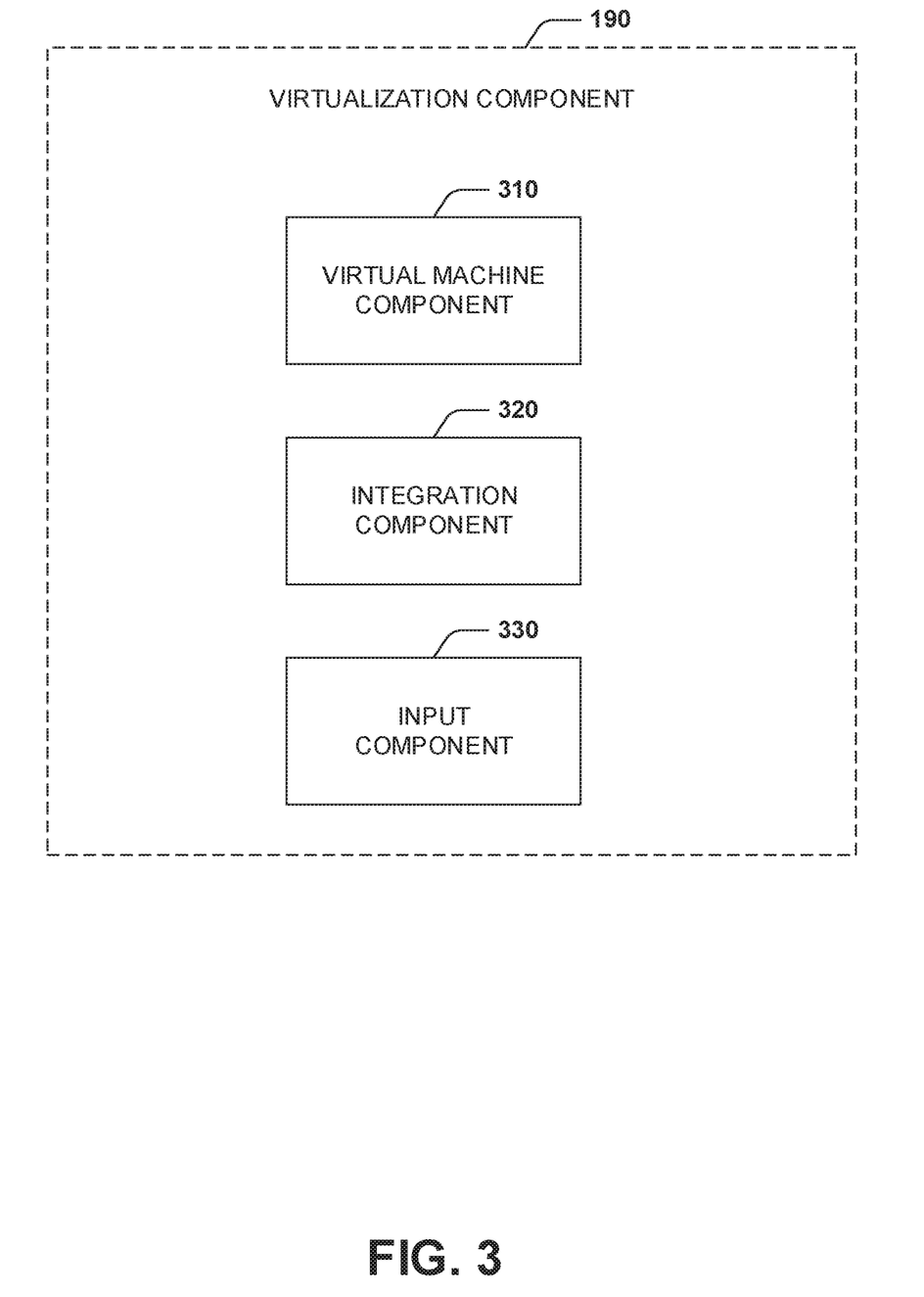
FIG. 3 illustrates an example component diagram of a virtualization component.

With reference to FIG. 3, the virtualization component 190 includes a virtual machine component 310. The virtual machine component 310 generates the virtual machine to be presented to the user. In one embodiment, the virtual machine is a process virtual machine, an application virtual machine, managed runtime environment (MRE), and/or the like. The virtual machine runs as a normal application inside an operating system or browser of the user device 110. The virtual machine can support a single user login. The virtual machine can be created when the management component 150 determines the user device 110 is unsecured or when the user opts to use the virtual machine. The virtual machine can be automatically deleted or uninstalled when user exits the virtual machine. In another embodiment, the virtual machine is a system virtual machine that virtualizes the whole user device 110. The virtual machine is presented to the user until the user logs off or ends their session to interact with the management component 150.

The virtualization component 190 includes an integration component 320. The integration component 320 interacts or communicates with the user device 110. In one embodiment, the integration component 320 communications with the browsing component 120. The integration component 320 forms a data connection with the user device 110 such that the virtual machine can be rendered on the user device 110 on the rendering component 140. The user can be presented with a user account login page within the virtual machine and displayed on the rendering component 140.

The integration component 320 can monitor a user's interaction with the virtual machine via the data connection. The user can interact with the virtual machine using the user interface 130. In one embodiment, the virtualization component 190 can include an input component 330. The input component 330 generates a virtualized keyboard to be displayed to the user within the virtual machine on the rendering component 140. The virtualized keyboard can be operated with the user interface 130 or a mouse such that characters can be selected on the virtualized keyboard using touches or mouse clicks. In one embodiment, the input component 330 can generate the virtual keyboard to be rendered in different ways and/or at different positions to counteract the possibility of spatial click-logging software recording positions at which clicks were entered and reconciling the clicks against alphanumeric keypad information to reconstruct user names and passwords of the user.

With continuing reference to FIG. 2, in one embodiment, the management component 150 includes a verification component 240. The verification component 240 confirms the identity of the user operating the user device 110. The verification component 240 can obtain $3^{rd}$ party verification of the rule from a user. In one embodiment, the verification component 240 can generate a 1-time code. The verification component 240 via the communication component 210, sends the 1-time code to the owner over a transmission server 250 having a processor and a memory to a secondary device 260 that is associated with the user or the user account. The user receives the 1-time code on the secondary device 260 and responds with the code either over the transmission server 250, the communication component 210, or over the established data connection through the virtualization component 190. The verification component 240 receives the 1-time code back from the user over the transmission server 350 from the user device 110. The verification component 340 determines the sent 1-time code and the received 1-time code match. It is appreciated that this is just one specific example of $3^{rd}$ party authentication. Other forms of authentication are contemplated, such as, but not limited to, voice recognition, image recognition, fingerprint recognition, biometric recognition, and/or the like.

The management component 150 provides access to the user account within the virtual machine operating in the browsing component 120. The user can enter authentication credentials within the virtual machine. The virtual machine presents pages within the browser. In one embodiment, the virtual machine appears substantially similar to the financial institution website to avoid confusion by the user. The virtual machine runs until the user logs out of the user account, closes the browser, or ends the virtual machine session. Ending the virtual machine session automatically logs the user out of the user account.

Figure 4:
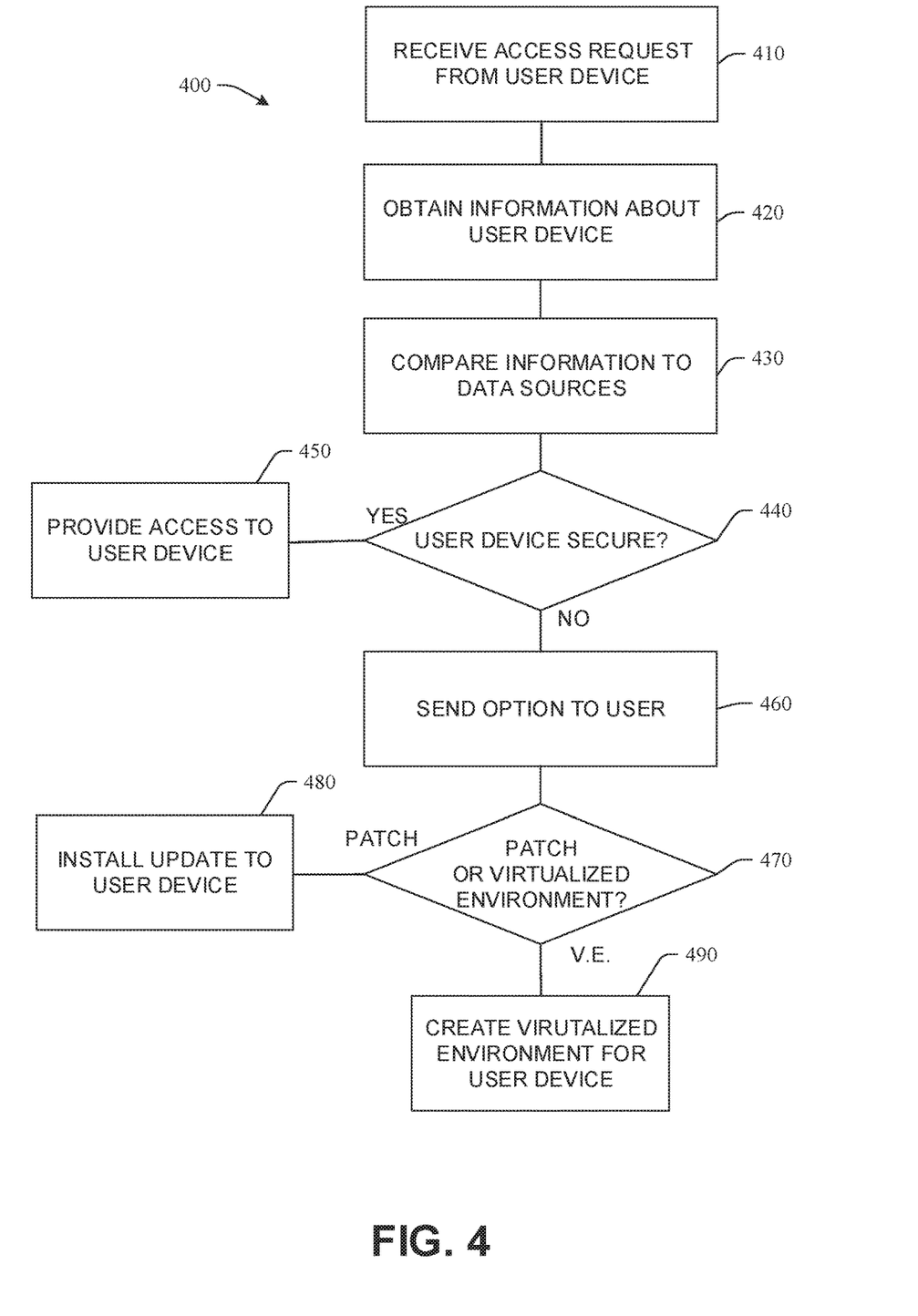
FIG. 4 illustrates a flowchart to manage an unpatched user device.

With reference to FIG. 4, an example method 400 is depicted for authenticating a customer of a financial institution. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

In aspects, method 400 can begin at 410 by receiving an access request from a user device. For example, a customer, i.e. user, desires to access a user account or complete a financial transaction using a financial institution website, network, and/or server. The customer initiates an access request to gain user account control and/or view information or perform financial transactions. In this specific example, the website approving or denying the request is a system of the financial institution that is remote from the user device of the customer. However, it is appreciated that the request may be received by a management device such as a computer, a mobile device and/or the like and used by the financial institution. At 420, information about the user device is obtained. The information can be included in the access request, or be obtained by the system of the financial institution. Continuing the example, the access request includes a browser version number associated with the browser that the user is using to access the financial institution. The browser version number is the build type or indicative of the recentness of the browser. The system receives the browser version number to use in determining if the user device is unsecured.

At 430, the user device information is compared to data sources to determine whether the user device is unsecured and/or using outdated software. In the example, the financial institution system checks the browser version against a list of allowable browsers and browser versions. At 440, the system determines whether the user device is secure. If the user device is secure, i.e. YES, the system grants access to the user account. In the example, the browser version matches to an acceptable browser version in the data sources. The system grants the access request and the customer proceeds to access the user account via the browser. If NO, an option is presented to the user on the user device at 460. In the example, an alert or pop up screen can be presented to the user on the user device. The user can select among the options presented.

The options 470 can be to install a security patch, e.g. update to the browser on the user device, or be redirected to a virtual machine. If the user selects to PATCH, the update or patch is downloaded and installed 480 on the user device. For example, the user selects to patch the browser. The patch is downloaded either from the financial institution or is redirected to a remote third-party server such as the browser developer. The patch is installed on the user device to bring the browser into up to date as dictated by the data sources.

If the user selects to run a virtual machine, the virtual machine is created 490 for the user device. The user device runs the virtual machine such that no malware or harmful software code can be transferred from the user device to the financial institution. In one embodiment, the user can be redirected within the browser to the virtual machine. In another embodiment, the user is not presented with a choice and is automatically redirected to a virtual machine within the browser on the user device. A virtual keyboard can be presented to the user within the virtual machine. The user's authentication credentials to access the user account can be protected using the virtualized keyboard. For example, a keyboard is displayed on the user device and the user enters keystrokes by clicking virtual keyboard keys with a mouse.

In other embodiments, it is appreciated and contemplated that there are various methods and handshakes to obtain the type, version and patch level of a browser. For example, browser determination can be via data in metadata included with a request to a bank system. The request may be made concurrently with other communications with the user device. In another embodiment, the request for browser determination could be via overt queries or call to the operating system of the user device or via an application temporarily running on the user device. In another embodiment, the browser verification is part of an initiation sequence of a bank application installed on the user device.

In other embodiments, the operating system is verified for version, patch, and/or build number. A virtual machine can be provided when the operating system is not up to date as described above for browser versions.

Figure 5:
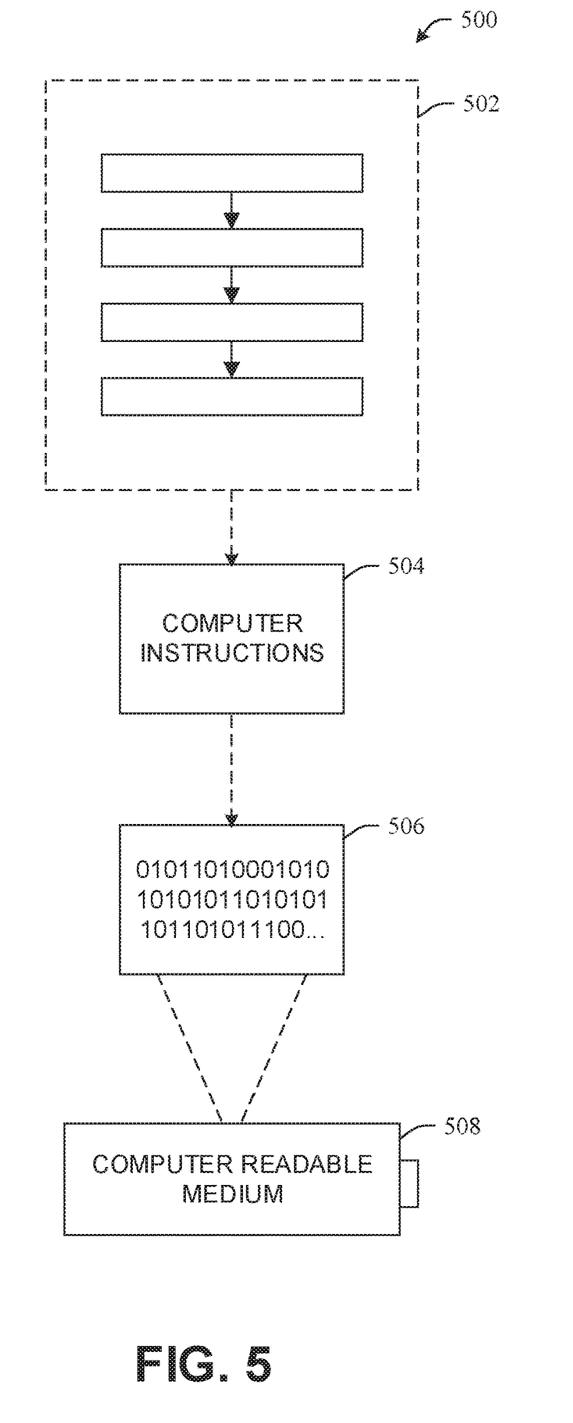
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
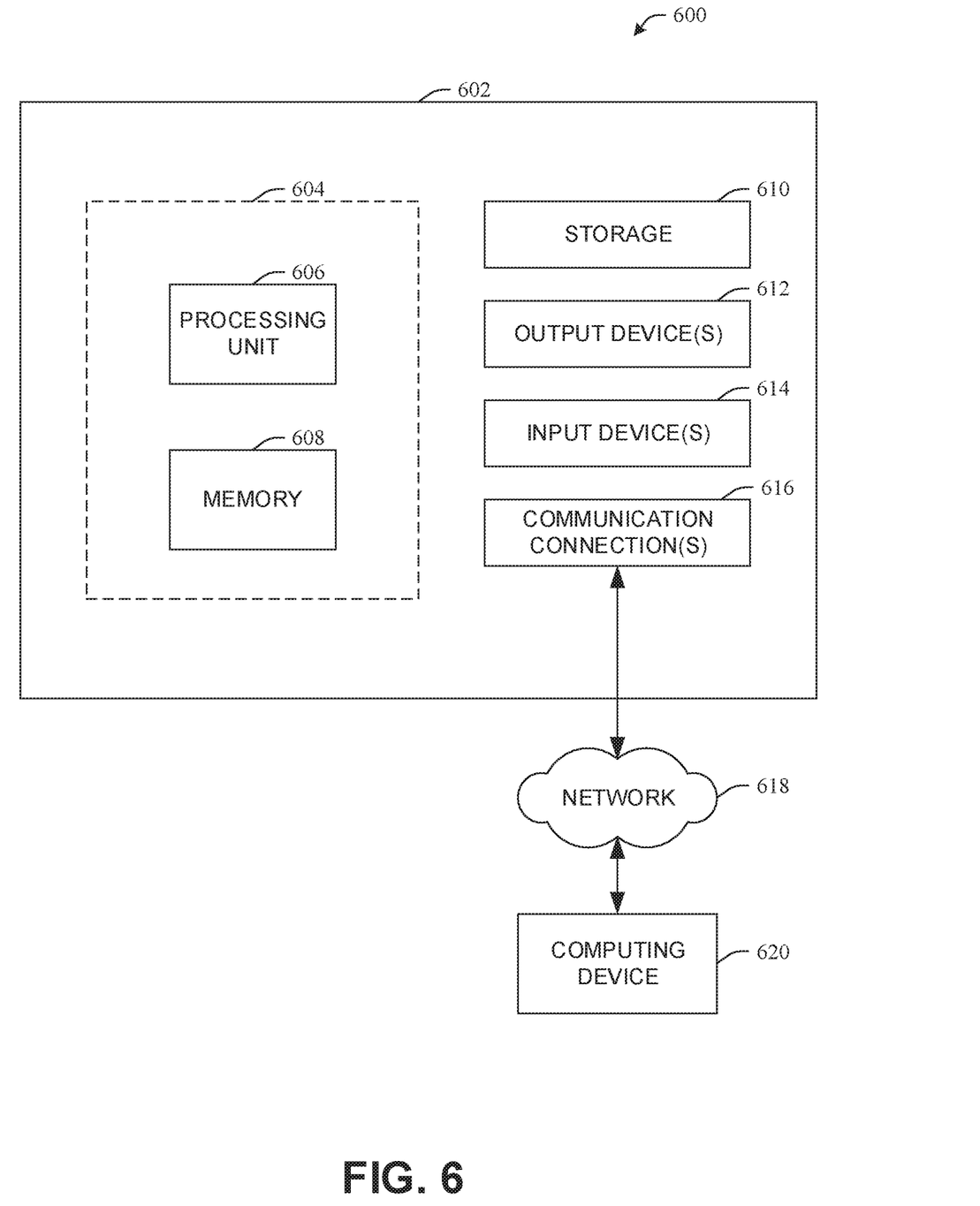
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor coupled to a memory that stores instructions that when executed by the processor cause the processor to:
determine a security status of a user device based on metadata associated with device configuration received in conjunction with an access request over a network from the user device, wherein the access request is processed by a browser on the user device;
send an alert to the user device including a plurality of selectable options for securing access in response to a determination that the browser processing the access request on the user device is unsecure, wherein a first option is a software update, wherein the first option includes at least a choice between automatic implementation of the software update and a choice of download of the software update, and a second option is invocation of a virtual machine, wherein the invocation of the virtual machine provides protection lacking by the browser on the user device, wherein the alert comprises selection information relating to the plurality of selectable options for securing the browser of the user device, wherein the selection information comprises a set of links for each of the plurality of selectable options, wherein when the second option is selected, the virtual machine is automatically deleted or uninstalled when the user exits the virtual machine;
receive a selection from the user device of an option from among the plurality of selectable options; and
secure the access based on the selection, by offering to update the browser software if a user is using an unsecured or unpatched browser, and wherein the virtual machine is initialized and accessed in response to receiving an indication of a selection of a link from the set of links, the link associated with generating the virtual machine via the browser of the user device.

2. The system of claim 1, wherein the metadata comprises browser version or build number information.

3. The system of claim 2, wherein determine the security status comprises comparing the browser version or build information to predetermined lists of secure or unsecure browsers.

4. The system of claim 1, wherein the invocation of the virtual machine comprises generating a virtual machine accessible through the browser on the user device.

5. The system of claim 4, wherein the virtual machine comprises a virtual keyboard rendered in the browser, and wherein input is received by keys on the virtual keyboard.

6. The system of claim 5, wherein the virtual keyboard is configured to change rendering positions to prevent spatial click logging.

7. The system of claim 4, the virtual machine generates a virtual environment that resembles a non-virtualized access website.

8. The system of claim 4, the instructions further cause the processor to shut down the virtual machine after a user logs out of a user account or closes the browser associated with the virtual machine.

9. The system of claim 1, the instructions further cause the processor to provide a link to a website for download of the software update on the user device.

10. A method, comprising:
executing, by a processor, instructions that cause the processor to perform operations comprising:
receiving a request from a user device over a network to access a user account, wherein the request includes metadata associated with user device configuration, and the request is processed by a browser on the user device;
determining a security status of the user device based on the metadata;
sending an alert to the user device including a plurality of selectable choices for securing access in response to a determination that the browser processing the request on the user device is unsecure, wherein a first choice is updating software, wherein the first choice includes at least a choice between automatic implementation of the software update and a choice of download of the software update, and a second choice is invoking of a virtual machine, wherein the invoking of the virtual machine provides protection lacking by the browser on the user device, wherein the alert comprises selection information relating to the plurality of selectable choices for securing the browser of the user device, wherein the selection information comprises a set of links for each of the plurality of selectable choices, wherein when the second choice is selected, the virtual machine is automatically deleted or uninstalled when the user exits the virtual machine;
receiving a selection from the user device of a choice from among the plurality of selectable choices; and securing the access based on the selection, by offering to update the browser software if a user is using an unsecured or unpatched browser, and wherein the virtual machine is initialized and accessed in response to receiving an indication of a selection of a link from the set of links, the link associated with generating the virtual machine via the browser of the user device.

11. The method claim 10, wherein receiving the request comprises receiving the request by way of the browser of the user device.

12. The method of claim 11, the operations further comprising extracting browser version or build number from the metadata.

13. The method of claim 12, wherein determining the security status comprises comparing the browser version or build number to a predetermined list of secure or unsecure browsers.

14. The method of claim 11, the operations further comprising providing a link in the browser to a website that includes the software update in response to selection of the first choice.

15. The method of claim 11, wherein the invoking of the virtual machine comprises generating a virtual machine accessible through the browser on the user device.

16. The method of claim 11, the operations further comprising rendering, by the virtual machine, a virtual keyboard in the browser that is configured to be rendered in different positions to prevent spatial logging, wherein input is received by way of keys on the virtual keyboard.

17. A computer-readable storage device that stores executable instructions that, in response to execution, cause a system comprising a processor to perform operations, comprising:
receiving a request from a user device over network to access a user account, wherein the request includes metadata associated with a browser of the user device, and the request is processed by a browser on the user device;
determining a security status of the user device based on the metadata by comparing browser version to predetermined secure or unsecure browser versions; sending an alert to the user device including a plurality of selectable options for securing access in response to a determination that the browser processing the access request on the user device is unsecure, wherein a first option is updating the browser, wherein the first option includes at least a choice between automatic implementation of the updating and a choice of download of the updating, and a second option is invoking a virtual machine in the browser, wherein the invoking of the virtual machine provides protection lacking by the browser on the user device, wherein the alert comprises selection information relating to the plurality of selectable options for securing the browser of the user device, wherein the selection information comprises a set of links for each of the plurality of selectable options, wherein when the second option is selected, the virtual machine is automatically deleted or uninstalled when the user exits the virtual machine;
receiving a selection from the user device of the first option or the second option; and
securing the access based on the selection, by offering to update the browser software if a user is using an unsecured or unpatched browser, and wherein the virtual machine is initialized and accessed in response to receiving an indication of a selection of a link from the set of links, the link associated with generating the virtual machine via the browser of the user device.

18. The computer-readable storage device of claim 17, further wherein invoking of the virtual machine renders a virtual keyboard in the browser and the virtual keyboard is configured to change rendering positions to prevent spatial click logging, wherein input is received by way of keys on the virtual keyboard.

19. The computer-readable storage device of claim 17, further comprising:
receiving authentication credentials from the user device by way of the virtual machine;
detecting the user device is using the virtual machine; and
allowing access to the user account, wherein the access is rendered in the virtual machine.

20. The computer-readable storage device of claim 19 further comprising shutting down the virtual machine after a user logs out of a user account or closes the browser associated with the virtual machine.

\* \* \* \* \*